(12) United States Patent
Ramler et al.

(10) Patent No.: US 10,145,346 B2
(45) Date of Patent: Dec. 4, 2018

(54) ELECTROMAGNETIC FUEL VALVE

(71) Applicant: Andreas Stihl AG & Co. KG, Waiblingen (DE)

(72) Inventors: Jens Ramler, Waiblingen (DE); Felix Mayer, Waiblingen (DE); Wolfgang Layher, Besigheim (DE); Georg Maier, Kernen (DE); Takumi Nonaka, Takizawa (JP); Hiroyuki Oka, Takizawa (JP); Hideki Watanabe, Hachimantashi (JP)

(73) Assignee: Andreas Stihl AG & Co. KG, Waiblingen (DE)

( * ) Notice: Subject to any disclaimer, the term of this patent is extended or adjusted under 35 U.S.C. 154(b) by 56 days.

(21) Appl. No.: 14/620,027

(22) Filed: Feb. 11, 2015

(65) Prior Publication Data
US 2015/0226167 A1  Aug. 13, 2015

(30) Foreign Application Priority Data

Feb. 11, 2014  (DE) .................. 10 2014 001 803

(51) Int. Cl.
*F02M 61/16* (2006.01)
*F02M 51/06* (2006.01)
*F02M 63/00* (2006.01)
(Continued)

(52) U.S. Cl.
CPC ......... *F02M 61/166* (2013.01); *B23P 15/001* (2013.01); *F02M 51/0639* (2013.01);
(Continued)

(58) Field of Classification Search
CPC ............. F02M 51/061; F02M 51/0639; F02M 51/0671; F02M 63/0043; F02M 63/0057;
(Continued)

(56) References Cited

U.S. PATENT DOCUMENTS 6,003,792 A * 12/1999 Munezane ......... F02M 51/0678
239/585.3
6,199,538 B1 * 3/2001 Aota .................... F02M 61/163
123/456

(Continued)

FOREIGN PATENT DOCUMENTS

CN    1580617 A      2/2005
EP    0042799 A2 * 12/1981 ......... F02M 51/0671
(Continued)

OTHER PUBLICATIONS

Marco Rubber & Plastic Products, Inc., O-Ring Material Comparisons.*
Parker Seals, Parker O-Ring Handbook 2001 Edition, 2001, paragraph 3.5 "Stretch", p. 3-8.*

*Primary Examiner* — Alexander Valvis
*Assistant Examiner* — Cody Lieuwen
(74) *Attorney, Agent, or Firm* — Walter Ottesen, P.A.

(57) ABSTRACT

An electromagnetic fuel valve has a valve chamber, a valve element and a valve seat assigned to the valve element. The valve chamber is delimited by an electromagnetic drive which moves the valve element relative to the valve seat. The drive includes a receiving housing for a coil carrier with an electrical coil. A magnet core is inserted into the coil carrier and has an end section facing the valve element. At an open sealing end facing toward the valve chamber, a sealing element is arranged between the end section of the magnet core and the receiving housing. To achieve good sealing, that end section of the magnet core situated in the sealing element expands the sealing element and compresses the material thereof radially against the edge of the sealing end of the receiving housing to seal the valve chamber to the interior space of the receiving housing.

11 Claims, 4 Drawing Sheets

(51) Int. Cl.
*B23P 15/00* (2006.01)
*F02M 51/08* (2006.01)

(52) U.S. Cl.
CPC .... *F02M 51/0671* (2013.01); *F02M 63/0043* (2013.01); *F02M 2051/08* (2013.01); *F02M 2200/16* (2013.01); *F02M 2200/8053* (2013.01); *F02M 2200/8061* (2013.01); *F02M 2200/9015* (2013.01); *Y10T 29/49417* (2015.01)

(58) Field of Classification Search
CPC ........... F02M 2200/16; F02M 2200/26; F02M 2200/8053; F02M 2200/8061; F02M 2200/9015; F02M 61/166; F02M 2051/08; B23P 15/001; Y10T 29/49417
USPC .................................. 239/95, 96, 584–585.5
See application file for complete search history.

(56) References Cited

U.S. PATENT DOCUMENTS

| | | | |
|---|---|---|---|
| 6,364,222 B1* | 4/2002 | Haltiner, Jr. ....... | F02M 51/0639 239/585.1 |
| 7,748,683 B1* | 7/2010 | Kelly .................. | F16K 31/0655 251/129.08 |
| 2002/0003176 A1 | 1/2002 | Muller-Girard, Jr. et al. | |
| 2002/0030123 A1 | 3/2002 | Haltiner, Jr. et al. | |
| 2003/0197143 A1 | 10/2003 | Kai et al. | |
| 2014/0217316 A1 | 8/2014 | Zelano et al. | |

FOREIGN PATENT DOCUMENTS

| | | |
|---|---|---|
| EP | 0 207 261 A1 | 1/1987 |
| GB | 2 058 466 A | 4/1981 |

\* cited by examiner

ELECTROMAGNETIC FUEL VALVE

CROSS REFERENCE TO RELATED APPLICATION

This application claims priority of German patent application no. 10 2014 001 803.2, filed Feb. 11, 2014, the entire content of which is incorporated herein by reference.

FIELD OF THE INVENTION

The invention relates to an electromagnetic fuel valve having a valve chamber which is assigned a valve element and a valve seat.

BACKGROUND OF THE INVENTION

Electromagnetic fuel valves of this type are known. The valve chamber is delimited by an electromagnetic drive which moves a valve element situated in the valve chamber. The drive is made of a receiving housing in which a coil carrier with an electrical coil is received. Into a central opening of the coil carrier there is inserted a magnet core, which is thus situated in the coil. With one end section, the magnet core faces the valve element, wherein the receiving housing and the magnet core are part of a magnetic circuit of the drive. To seal the receiving housing with respect to the valve chamber, a sealing element is arranged between the end section of the magnet core and the receiving housing.

The sealing of the interior space of the receiving housing with the electrical coil is necessary in order to reliably separate the electrical side of the electromagnetic drive from the liquid side. If fuel ingresses into the receiving housing, this can lead to faults in the electromagnetic drive, to the point of failure of the drive.

SUMMARY OF THE INVENTION

It is an object of the invention to further develop an electromagnetic fuel valve of the generic type such that simple, effective sealing of the receiving housing with respect to the fuel-conducting valve chamber is ensured.

A core concept of the invention lies in the fact that the sealing element that is provided is expanded by the end section of the inserted magnet core such that the material of the sealing element is compressed radially against the edge of a sealing end of the outer housing and reliably seals the valve chamber with respect to the interior space of the receiving housing.

Through this configuration, the magnet core which protrudes into the sealing element is also sealed with respect to the coil carrier itself.

To ensure reliable expansion of the sealing element without mechanical damage, it is provided that that end section of the magnet core which faces toward the sealing element is of rounded and/or tapered form in the direction of its free end.

The sealing element is formed—expediently in integral fashion—on an axial end of the coil carrier. The sealing element is thus made of the same material as the coil carrier itself, wherein use is expediently made of a deformable plastic which has good sealing characteristics and which is in particular also resistant to fuel.

The open sealing end, which faces toward the valve chamber, of the receiving housing has an inner annular offset which delimits the open sealing end. The sealing element is configured so as to be seated on the annular offset. The annular offset has an inner wall which delimits an opening in the open sealing end of the receiving housing, wherein the opening is situated approximately coaxially with respect to the wall of the receiving housing. When the magnet core is inserted into the sealing element, the sealing element is situated in compressed form between the end section of the magnet core and the inner wall of the annular offset.

Provision is advantageously made for the annular offset to have an inner shoulder which is situated so as to face toward the coil carrier. The inner shoulder has a shoulder surface which encloses an angle of greater than 90° with the inner wall of the receiving housing. The angle is expediently in a range from approximately 145° to approximately 150°.

The annular offset may be provided as a stop for the insertion depth of the coil carrier into the receiving housing.

Before the end section of the magnet core protrudes into the sealing element, the non-deformed sealing element has a free inner diameter smaller than the outer diameter of the end section of the magnet core. In an expedient embodiment, the inner diameter of the non-deformed sealing element is approximately 1% to 12% smaller than the diameter of the end section of the magnet core. The inner diameter of the non-deformed sealing element is advantageously approximately 2% to 6% smaller than the outer diameter of the end section of the magnet core.

In the method according to the invention for sealing an interior space of a receiving housing of an electromagnetic drive of a fuel valve with respect to a valve chamber, provision is made for the coil carrier with the electrical coil to firstly be inserted into the interior space of the receiving housing. Then, the advantageously cylindrical magnet core is inserted into the central opening of the coil carrier, wherein an end section of the magnet core protrudes into a sealing element which is provided on that end of the coil carrier which faces toward the valve chamber. The sealing element closes off the open sealing end, which faces toward the valve chamber, of the receiving housing and imparts its sealing action by virtue of the magnet core being inserted into the sealing element, wherein that end section of the magnet core which protrudes into the sealing element compresses the material of the sealing element radially against the edge of the receiving housing, such that the interior space of the receiving housing is sealed with respect to the valve chamber. The compression of the sealing element simultaneously has the effect that the coil carrier is reliably sealed with respect to the magnet core. This is achieved in that, when the magnet core is pressed into the coil carrier, the material of the sealing element is displaced substantially radially and fills the gap between the magnet core and the annular offset of the receiving housing under pressure.

To generate an adequate pressure, provision is made for the inner diameter of the sealing element to be expanded by a magnitude of approximately 1% to 12%, in particular by a magnitude of approximately 2% to 6%.

When the magnet core has been inserted into the sealing element, the receiving housing is cast in resin together with the coil carrier, the coil and the inserted magnet core.

BRIEF DESCRIPTION OF THE DRAWINGS

The invention will now be described with reference to the drawings wherein.

DESCRIPTION OF THE PREFERRED EMBODIMENTS OF THE INVENTION

The electromagnetic fuel valve illustrated in the figures is made of an electromagnetic drive 1 which switches a valve element 2 assigned to a valve seat 26.

Figure 1:
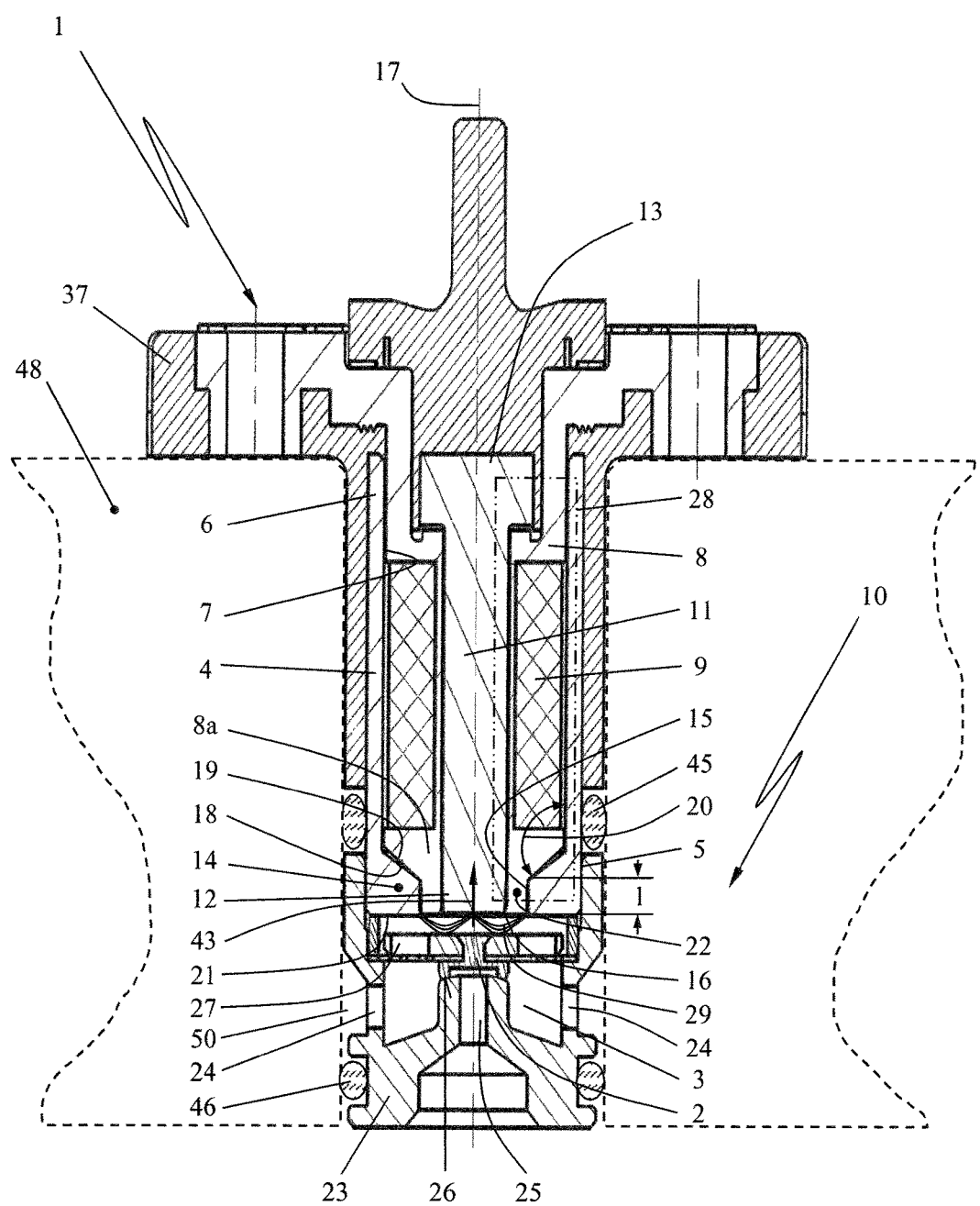
FIG. 1 is a schematic section through an electromagnetic fuel valve in a first embodiment.

The electromagnetic drive 1 is made substantially of a preferably cylindrical receiving housing 4 which may be in the form of a cylindrical bushing. The receiving housing 4 is open both at its sealing end 5 facing toward a valve chamber 3 and at the assembly end 6 facing away from the valve chamber 3. In the interior space 7 of the receiving housing 4 there is received a coil carrier 8, wherein the coil carrier 8 substantially fills the interior space 7. On the coil carrier 8 there is held an electrical coil 9 which is energized for the purpose of actuating the electromagnetic fuel valve 10. A magnet core 11 is inserted into the coil carrier 8. The end section 12 of the magnet core 11, which faces toward the valve chamber, is situated in the open sealing end 5 of the receiving housing 4. At its connection end 13, the magnet core 11 substantially closes off the open assembly end 6 of the receiving housing 4, wherein leadthroughs for the electrical connections of the coil 9 are formed between the receiving housing 4 and the connection end 13 of the magnet core 11, as shown in FIG. 1.

The open sealing end 5, which faces toward the valve chamber 3, of the receiving housing 4 has an annular offset 14 which delimits the open sealing end 5. The annular offset 14 is formed with an inner wall 15 which is situated approximately coaxially with respect to the wall of the receiving housing 4. The inner wall 15 delimits an opening 16 in the open sealing end 5, wherein the opening 16 is situated coaxially with respect to a longitudinal central axis 17 of the receiving housing 4 or of the electromagnetic drive 1.

The annular offset 14 furthermore has an inner shoulder 18 which is situated so as to face toward the interior space 7 or the coil carrier 8, the shoulder surface 19 of which inner shoulder is situated at an angle 20 with respect to the wall of the receiving housing 4. The shoulder surface 19 forms a conical annular surface.

The angle 20 of the shoulder surface 19 is generally greater than 90°; in the embodiment shown, the angle 20 is approximately 145° to 150°.

The annular offset 14 may be formed as a stop for the insertion depth of the coil carrier 8 into the receiving housing 4.

That face side 21 of the annular offset 14 which faces away from the interior space 7 of the receiving housing 4 simultaneously forms the outer face side, facing toward the valve chamber 3, of the receiving housing 4. The face side 21 delimits the valve chamber 3.

That end section 12 of the magnet core 11 which faces toward the valve chamber 3 is situated in sealed fashion in the opening 16. For this purpose, a sealing element 22 is provided which is situated in compressed form between the end section 12 of the magnet core 11 and the inner wall 15 of the annular offset 14. In this way, the electromagnetic drive 1 is fully sealed with respect to the valve chamber 3, such that an ingress of liquid into the interior space 7 of the receiving housing 4 is reliably prevented.

In the embodiment of FIG. 1, the valve chamber 3 is formed in a valve housing 23 which is preferably of cylindrical form and which is pushed sealingly onto the receiving housing 4. The valve chamber 3 is connected via inlets 24 to a fuel-supplying chamber 50; in the embodiment shown, the inlets 24 are provided as radial bores in the cylinder wall of the valve housing 23.

The chamber 50 of annular form is formed in a housing 48, in which the fuel valve 10 is inserted into a receiving bore. The chamber 50 is sealed with respect to the fuel valve by way of seals 45 and 46, preferably O-rings. The inlets 24 connect the fuel-filled chamber 50 to the valve chamber 3.

The valve chamber 3 furthermore has a central outlet 25 which, in the embodiment shown, lies on the longitudinal central axis 17 of the electromagnetic drive. The outlet 25 is provided as a dome-like elevation in the valve chamber 3; the free dome and forms a valve seat 26 to which the valve element 2 is assigned. The valve element 2 is held in the valve chamber 3, so as to be oriented with respect to the valve seat 26, by way of a spring plate 27, a diaphragm spring or the like, wherein, in the shown rest position of the fuel valve 10, the valve element 2 is held sealingly on the valve seat 26 under the action of the spring force.

The spring plate 27 has apertures, such that the valve element 2 is fully surrounded by the liquid situated in the valve chamber 3.

The receiving housing 4 and the magnet core 11 are made of a magnetizable material and are part of a magnetic circuit 28. When the coil 9 is energized, a magnetic field 29 is generated. The force of the magnetic field 29 causes the valve element 2, which faces the end section 12 of the magnet core 11, to be magnetically attracted and lifted off the valve seat 26 in the arrow direction 43. The liquid, in particular fuel, situated in the valve chamber 3 can flow out via the outlet 25. When the current is shut off, the magnetic field 29 breaks down and the valve element 2, which is made of magnetic material, is moved back against the valve seat 26 under spring action. The outlet 25 is closed.

The sealing element 22 is configured such that that end section 12 of the magnet core 11 which is situated in the sealing element expands the sealing element 22 and compresses the material of the sealing element 22 radially against the inner wall 15 of the opening 16 of the outer housing 4. Good sealing of the valve chamber 3 with respect to the interior space 7 of the receiving housing 4 is realized in this way.

Not only does the sealing element 22 act between the receiving housing 4 and the coil carrier 8, but the sealing element 22 simultaneously seals the magnet core 11 with respect to the coil carrier 8, such that an ingress of liquid from the valve chamber 3 into the interior space 7 of the receiving housing 4 is reliably prevented.

In the embodiment shown, the sealing element 22 is provided on an axial end 8a of the coil carrier 8; in a preferred embodiment, the sealing element 22 is formed integrally on the axial end 8a of the coil carrier 8. In this case, the sealing element 22 is made of a deformable plastic which is displaced or "flows" under pressure, in such a manner that the material is displaced. In this way, the sealing element 22 is compressed in the opening 16 of the open sealing end 5 of the receiving housing 4; in this way, an intense sealing action can be attained over an axial length l.

Figure 3:
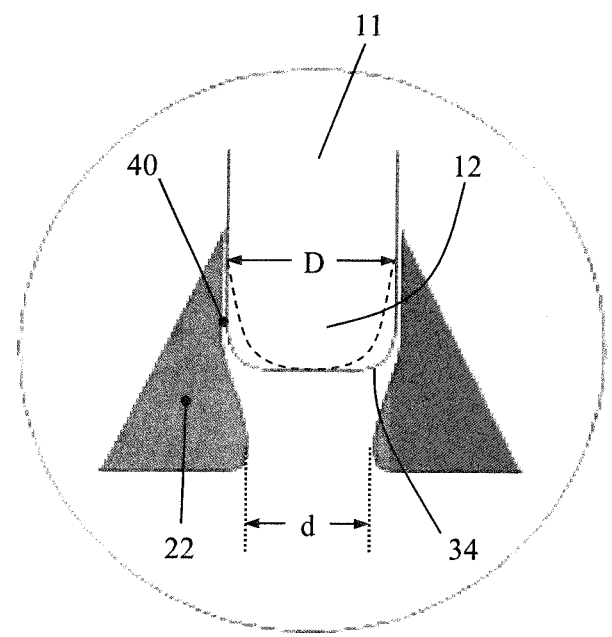
FIG. 3 is an enlarged schematic showing the end section of the magnet core which protrudes into a seal on the coil carrier as per detail III in FIG. 2.
Figure 4:
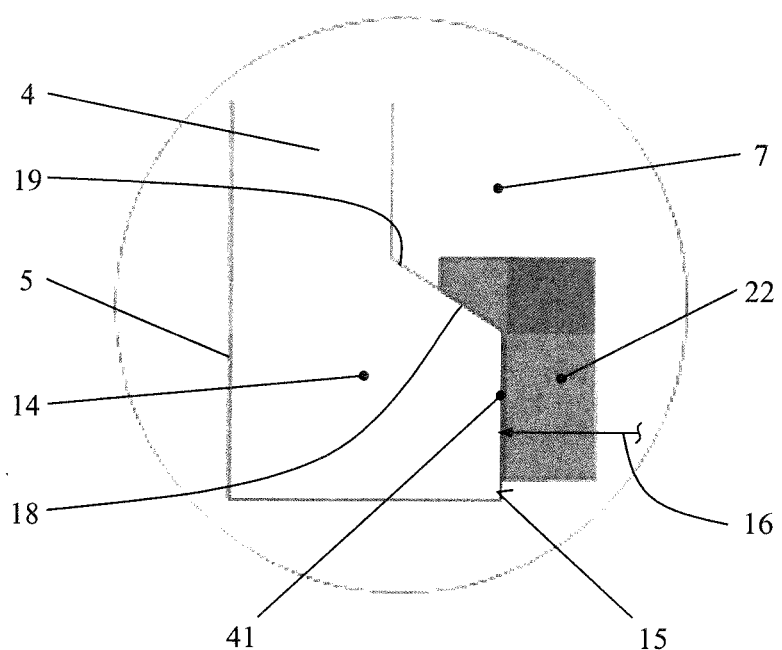
FIG. 4 is an enlarged schematic showing the seal between a receiving housing of the coil carrier and the sealing element as per detail IV in FIG. 2; and, FIG. 5 is a schematic section through a further embodiment of an electromagnetic fuel valve.

The principle of the compressed sealing element 22 will be described on the basis of the schematic illustrations in FIGS. 2 to 4. Identical parts are denoted by the same reference signs as in FIG. 1.

A coil carrier 8 is inserted into the interior space 7 of a receiving housing 4, wherein the coil carrier has a receiving section 8' for the coil 9. The receiving section 8' is delimited by face walls 30 and 31.

The sealing element 22 is integrally formed on one end 8a of the coil carrier 8, wherein the sealing element 22 may be part of the face wall 31 of the coil carrier 8.

Figure 2:
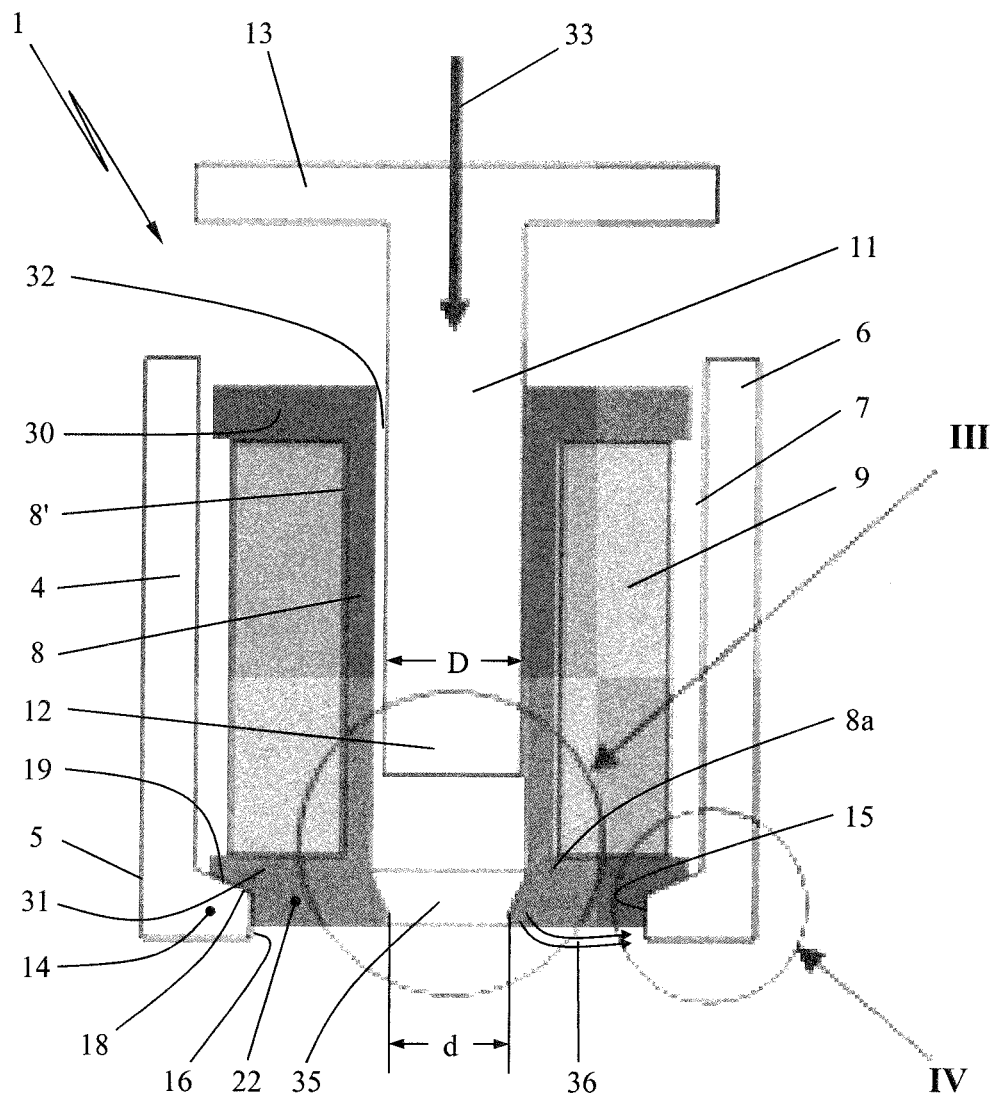
FIG. 2 is a schematic showing the insertion of a magnet core into a coil carrier.

As shown in FIG. 2 on an exaggerated scale, the sealing element 22 has an inner diameter (d) which is smaller than the outer diameter D of the cylindrical magnet core 11. In the embodiment, the inner diameter (d) of the non-deformed sealing element 22 is approximately 1% to 12% smaller than the outer diameter D of the end section 12 of the magnet core 11. The inner diameter (d) of the non-deformed sealing element 22 is advantageously approximately 2% to 6% smaller than the outer diameter D of the end section 12 of the magnet core 11.

As is also shown in FIG. 2, it is provided on the one hand that the sealing element 22, at the outer edge of the face wall 31, lies against the shoulder 18, and on the other hand that the sealing element lies within the opening 16 of the open sealing end 5 of the receiving housing 4. If the end section 12 of the magnet core 11 is then inserted into the central receptacle 32 of the coil carrier 8 in the arrow direction 33, the end section 12 of the magnet core 11 protrudes into the sealing element 22 and expands the latter. To prevent peeling of the sealing element 22, which is made of deformable plastic, provision is made for the end section 12, which is to be inserted into the sealing element 22, to be formed with a rounded head 34 (FIG. 3). The end section 12 of the magnet core 11 is preferably of tapered form toward its free end, as indicated by dashed lines (FIG. 3).

Upon the insertion of the end section 12 of the magnet core 11 into the central opening 35, which is formed with a relatively small diameter (d), of the sealing element 22, the material of the sealing element 22 is displaced radially outward, wherein the material—as indicated by the arrows 36—is displaced radially outward, in particular in "flowing" fashion, and comes to lie sealingly against the inner wall 15 of the annular offset 14, that is, seals the opening 16 in the sealing end 5.

When the end section 12 of the magnet core 11 has been inserted fully into the seal, the free face side of the end section 12 of the magnet core 11 lies approximately in a plane with the face side 21 of the receiving housing 4; expediently, the face side of the end section 12 of the magnet core 11 has a small spacing to the face side 21 of the receiving housing 4.

As a result of the displacement of the material of the sealing element as per the arrow direction 36 in FIG. 2, liquid-tight sealing between the sealing element 22 itself and the open sealing end 5 of the receiving housing 4 is also attained. The material of the sealing element 22 lies in compressed form between the end section 12 of the magnet core 11 and the annular offset 14; as shown in FIG. 1, the end section 12 of the magnet core 11 protrudes into the annular offset 14, giving rise to an axial sealing length l which corresponds approximately to the axial height of the inner wall 15 of the annular offset 14.

When the end section 12 of the magnet core 11 has been inserted fully into the sealing element 22, the outer circumference of the end section 12 of the magnet core 11, as first sealing surface 40, is sealed over the circumference of the end section 12 of the magnet core 11; the compression and displacement of the material of the sealing element 22 also results in a sealing action between the sealing element 22 and the inner wall 15 of the annular offset 14, which forms a second sealing surface 41.

When the magnet core 11 has been inserted and installed fully into the receiving housing 4 via the open assembly end 6 of the receiving housing 4, the electromagnetic drive 1 can be completed to an operationally ready state, and the receiving housing 4 can be cast in resin together with the coil carrier 8, the coil 9 and the inserted magnet core 11. The casting compound 37 (FIG. 1) ensures liquid-tight closure of the electromagnetic drive 1 also at the assembly end 6 of the receiving housing 4 and at the connection end 13 of the magnet core 11, which is in particular of cylindrical form; the casting compound 37 may simultaneously be utilized as a material which forms a housing wall, as shown in FIG. 1.

Figure 5:
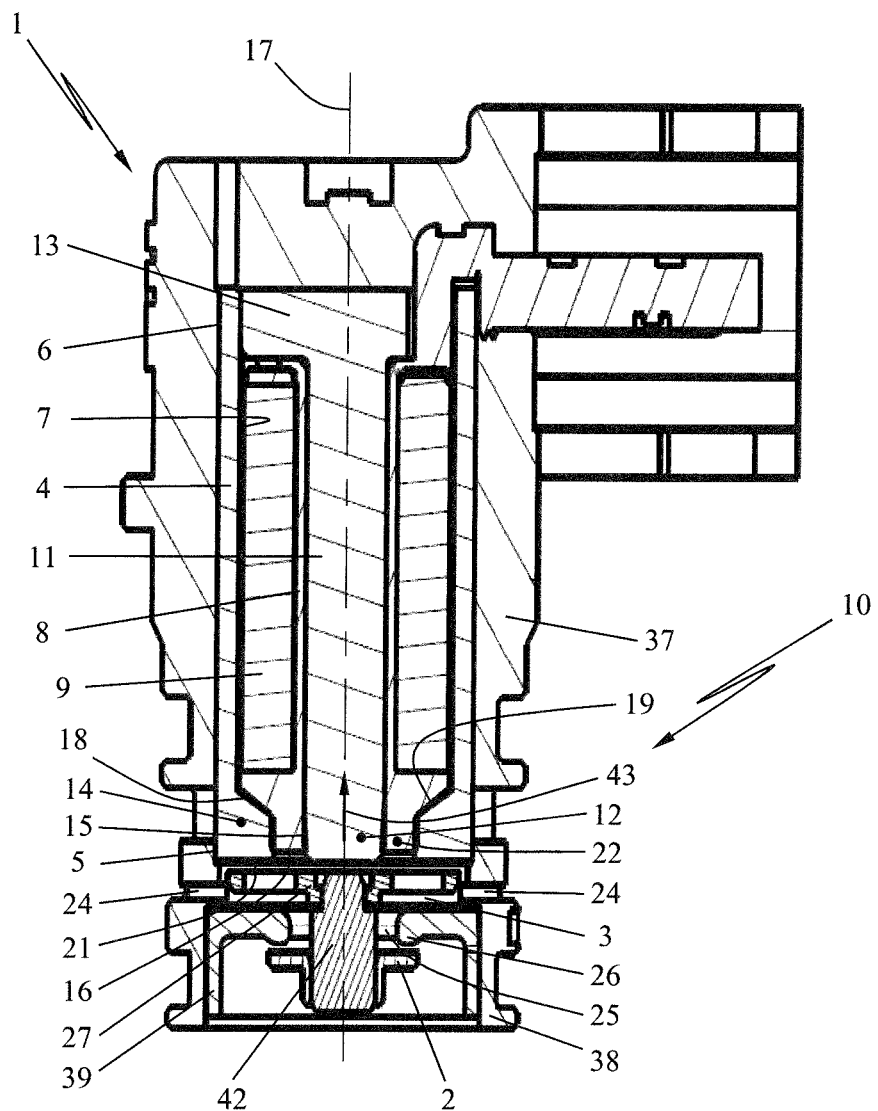

The embodiment in FIG. 5 corresponds in terms of basic construction to that in FIG. 1, for which reason the same reference signs are used for identical parts.

Whereas it is the case in the embodiment of FIG. 1 that the valve chamber 3 has been sealingly pushed onto the sealing end 5 of the receiving housing 4, it is provided in the embodiment in FIG. 5 that a cylindrical extension 38 is formed which projects beyond the sealing end 5 of the receiving housing 4. A valve insert 39 on which the valve seat 26 is formed is inserted into the cylindrical extension 38. The valve element 2 lies outside the valve chamber 3 and is held via the spring plate 27 situated in the valve chamber 3 and via a mounting journal 42. The mounting journal 42 projects through the outlet 25, which is formed in the valve insert 39 concentrically with respect to the longitudinal central axis 17. The extension 38 may be formed from the casting compound 37 which forms the housing.

The electromagnetic fuel valve shown in FIG. 5 is open when in the deenergized state; when the coil 9 is energized, the magnetic mounting journal 42 is attracted counter to the force of the spring of the spring plate 27, whereby the valve element 2 closes the outlet 25. When the current is shut off, the mounting journal 42 falls away, and the valve element 2 lifts from the valve seat 26; the outlet 25 is open.

It is understood that the foregoing description is that of the preferred embodiments of the invention and that various changes and modifications may be made thereto without departing from the spirit and scope of the invention as defined in the appended claims.

What is claimed is:

1. An electromagnetic fuel valve comprising:
a valve chamber;
a valve member;
a valve seat associated with said valve member;
an electromagnetic drive delimiting said valve chamber and configured to move said valve member relative to said valve seat;
a coil carrier made of a deformable plastic material;
an electric coil held on said coil carrier;
said electromagnetic drive having a receiving housing defining an interior space and a magnet core having an end section;
said coil carrier being received in said receiving housing;
said magnet core being inserted in said coil carrier;
said end section of said magnet core having an outer diameter (D) and lying opposite to said valve member;
said receiving housing and said magnet core conjointly defining part of a magnetic circuit;
said receiving housing having an open sealing end facing said valve chamber;

a sealing element arranged at said sealing end;

said coil carrier having an axial end and said sealing element being built as a monolithic part of said coil carrier, whereby said deformable plastic material of said axial end of said coil carrier defines sealing material of said sealing element; and, said axial end of said coil carrier having a free inner diameter (d) which is less than said outer diameter (D) of said end section of said magnet core so as to cause said magnet core to widen said coil carrier and by widening said plastic material of said axial end of said coil carrier radially towards said sealing end of said receiving housing causes the displaced plastic material of said axial end of said coil carrier to seal said valve chamber with respect to said interior space of said receiving housing.

2. The fuel valve of claim 1, wherein said sealing element seals said magnet core with respect to said coil carrier.

3. The fuel valve of claim 1, wherein said end section of said magnet core disposed in said sealing element has a free end and is tapered toward said free end.

4. The fuel valve of claim 1, wherein:

said open sealing end of said receiving housing facing said valve chamber has an inner annular offset delimiting said open sealing end; and, said sealing element is seated on said annular offset.

5. The fuel valve of claim 4, wherein:

said annular offset has an inner wall delimiting an opening in said open sealing end of said receiving housing; and, said receiving housing having a wall which is coaxial to said inner wall.

6. The fuel valve of claim 5, wherein said sealing element is disposed in a compressed manner between said end section of said magnet core and said inner wall of said annular offset.

7. The fuel valve of claim 4, wherein:

said annular offset has an inner shoulder facing said coil carrier;

said annular offset has an inner wall; and, said inner shoulder has a shoulder surface enclosing an angle greater than 90° with said inner wall of said annular offset.

8. The fuel valve of claim 4, wherein said annular offset is configured as a stop for an insertion depth of said coil carrier into said receiving housing.

9. The fuel valve of claim 1, wherein said inner diameter (d) is approximately 1% to 12% smaller than said outer diameter (D).

10. The fuel valve of claim 1, wherein, by widening said coil carrier, a material flow is initiated to press said sealing plastic material of said axial end of said coil carrier radially against said sealing end of said receiving housing.

11. An electromagnetic fuel valve comprising:

a valve chamber;

a valve member;

a valve seat associated with said valve member;

an electromagnetic drive delimiting said valve chamber and configured to move said valve member relative to said valve seat;

a coil carrier made of a deformable plastic material and having an axial end;

an electric coil held on said coil carrier;

said electromagnetic drive having a receiving housing defining an interior space and a magnet core having an end section;

said coil carrier being received in said receiving housing;

said magnet core being inserted in said coil carrier;

said end section of said magnet core having an outer diameter (D) and lying opposite to said valve member;

said receiving housing and said magnet core conjointly defining part of a magnetic circuit;

said receiving housing having an open sealing end facing said valve chamber;

said axial end of said coil carrier being configured as a sealing element built as a monolithic part of said coil carrier, whereby the deformable plastic material of said axial end of said coil carrier defines sealing material which forms said axial end of said coil carrier between said end section of said magnet core and said open sealing end of said receiving housing;

said open sealing end defining an edge;

said axial end of said coil carrier defining a free inner diameter (d) which is less than said outer diameter (D) of said end section of said magnet core so as to cause said magnet core with said end section to widen said deformable plastic material of said axial end of said coil carrier; and, said end section of said magnet core being configured to press said deformable plastic material of said axial end of said coil carrier radially against said edge of said open sealing end of said receiving housing such that pressed deformable material of said axial end of said coil carrier seals said valve chamber with respect to said interior space of said receiving housing.

* * * * *